United States Patent [19]

von der Eltz

[11] Patent Number: 5,609,676

[45] Date of Patent: Mar. 11, 1997

[54] RECYCLING OF DYED CELLULOSIC WASTE

[75] Inventor: Andreas von der Eltz, Frankfurt am Main, Germany

[73] Assignee: Hoechst Aktiengesellschaft, Frankfurt am Main, Germany

[21] Appl. No.: 569,510

[22] Filed: Dec. 8, 1995

[30] Foreign Application Priority Data

Dec. 13, 1994 [DE] Germany .......................... 44 44 245.9

[51] Int. Cl.⁶ .............................. C09D 101/24; C08L 1/24
[52] U.S. Cl. .................... 106/166.01; 106/166.2; 106/166.3; 106/166.4; 106/166.41; 106/166.42; 106/166.5
[58] Field of Search ............................ 106/166.01, 166.2, 106/166.3, 166.4, 166.41, 166.42, 166.5

[56] References Cited

U.S. PATENT DOCUMENTS

| | | | |
|---|---|---|---|
| 2,184,586 | 12/1939 | Donagemma et al. ................. | 260/217 |
| 2,337,928 | 12/1943 | Reichel ................................ | 260/217 |
| 2,979,500 | 4/1961 | Opderbeck et al. .................... | 260/217 |
| 3,817,983 | 6/1974 | TenBroeck, Jr. et al. .............. | 260/217 |

FOREIGN PATENT DOCUMENTS

| | | | |
|---|---|---|---|
| 1267490 | 4/1990 | Canada .............................. | D06P 1/52 |
| 2084585 | 6/1993 | Canada .............................. | D06P 5/22 |
| 137367 | 8/1979 | Germany .......................... | D01F 13/02 |
| 2906138 | 9/1980 | Germany .......................... | D06P 5/02 |
| 229141A1 | 10/1985 | Germany .......................... | C08J 11/00 |

*Primary Examiner*—David Brunsman
*Attorney, Agent, or Firm*—John M. Genova

[57] ABSTRACT

A process which comprises suspending a reactive-dyed cellulose material, optionally in mixture with pulp, in an alkali metal hydroxide solution (alkali cellulose), optionally subjecting the alkali cellulose to the action of a reducing sulfur compound at a temperature from 20° to 80° C., then allowing the alkali cellulose to ripen at temperatures from 30° to 80° C. for at least 30 minutes, dissolving the alkali cellulose at a temperature from 10° to 30° C. by conversion with carbon disulfide into the xanthate, and spinning the xanthated alkali cellulose into fibers, makes it possible to recycle cellulosic waste textiles into similarly colored or colorless cellulose fiber materials.

17 Claims, No Drawings

RECYCLING OF DYED CELLULOSIC WASTE

Numerous textbooks (e.g. G. Ebner, D. Scholz, Textil-färberei und Farbstoffe, Springer Verlag 1989, page 50) relate how celluloses, chiefly in the form of pulp, are made into viscoses by the xanthate process. Aside from the xanthate process there are other processes for dissolving and spinning celluloses and linters, for example the nitrate process, the acetate process, the copper process (cuprammonium rayon, Bemberg silk) and the N-methylmorpholine N-oxide process (®Tencel). Cellulose can also be dissolved using LiOH/ dimethylformamide. The pulp used comes predominantly from wood products and has a lower degree of polymerization than cotton. Linters are short cotton fibers and, because of their cost, are used as a raw material in viscosemaking usually only in the cuprammonium process which is used for producing hollow membranes for dialysis. The feedstocks mentioned come directly from the woodpulp industry; that is, existing processes for making viscoses always require virgin raw materials.

The disposal of usually dyed waste textiles, chiefly those made of cotton, currently constitutes an increasing problem in the industrialized countries. There are as yet no suitable composting conditions for such waste textiles.

Textiles are already being recycled in secondhand shops and into shoddy. Colored textiles have hitherto not been recycled into articles of higher value.

It is an object of the present invention to find a way of solving the aforementioned disposal problem.

It has been found that, surprisingly, colored waste textiles made of cellulose fibers can, after prior comminution, be redissolved as xanthate in sodium hydroxide solution and processed into colored viscose fiber or film/sheet if the waste textiles have first been sorted according to color.

The present invention accordingly provides a process for making viscose, which comprises suspending a reactive-dyed cellulose material, optionally in mixture with pulp, in an alkali metal hydroxide solution (alkali cellulose), optionally subjecting the alkali cellulose to the action of a reducing sulfur compound at a temperature from 20° to 80° C., then allowing the alkali cellulose to ripen at temperatures from 30° to 80° C. for at least 30 minutes, dissolving the alkali cellulose at a temperature from 10° to 30° C. by conversion with carbon disulfide into the xanthate, and processing the xanthated alkali cellulose into fiber or film/sheet.

The processing into fiber conveniently takes the form of forcing a spinning solution through fine holes into a coagulation bath. In this coagulation bath, the xanthate is destroyed and the re-formed viscose precipitates in the acid medium. The coagulation bath customarily contains sulfuric acid and zinc sulfate. It may also contain other customary additives. Film/sheet is produced by making the xanthated alkali cellulose flow in a conventional manner, for example from funnellike containers, through fine adjustable slots dipping into the coagulation bath, the film/sheet hardening similarly to viscose fiber (Ullmann (4th), 11, 678 ff., 436f; A5, 401–404).

Suitable cellulose material for use in the process of the present invention includes waste textiles made of cellulose fibers, in particular cotton, post-use viscose material and other regenerated celluloses and also amination-modified viscose and cotton materials as described for example in EP-A-0 546 476, DE-A-2 930 738, EP-A-0 276 597, Japanese Patent Application Publication Hei-5-5279, CA-A-1 267 490 and CA-A-2 084 585, which have been dyed with reactive dyes, in particular those having a vinyl sulfone hook.

Such dyes have been extensively described in the literature. The dyes can belong to a wide range of dye classes, for example the class of the monoazo, disazo, polyazo, metal complex azo dyes, such as 1:1 copper, 1:2 chromium and 1:2 cobalt complex monoazo and disazo dyes, and also to the series of the anthraquinone dyes, copper, nickel and cobalt phthalocyanine dyes, copper formazan dyes, azomethine, nitroaryl, dioxazine, triphendioxazine, phenazine and stilbene dyes.

Examples of fiber-reactive radicals are: vinylsulfonyl, β-chloroethylsulfonyl, β-sulfatoethylsulfonyl, β-acetoxyethylsulfonyl, β-phosphatoethylsulfonyl, β-thiosulfatoethylsulfonyl, N-methyl-N-(β-sulfatoethylsulfonyl)amino, acryloyl, —CO—CCl=CH$_2$, —CO—CH=CH—Cl, —CO—CCl=CHCl, —CO—CCl=CH—CH$_3$, —CO—CBr=CH$_2$, —CO—CH=CH—Br, —CO—CBr=CH—CH$_3$, —CO—CCl=CH—COOH, —CO—CH=CCl—COOH, —CO—CBr=CH—COOH, —CO—CH=CBr—COOH, —CO—CCl=CCl—COOH, —CO—CBr=CBr—COOH, β-chloro- or β-bromo-propionyl, 3-phenylsulfonylpropionyl, 3-methylsulfonylpropionyl, 3-chloro-3-phenylsulfonylpropionyl, 2,3-dichloropropionyl, 2,3-dibromopropionyl, 2-fluoro-2-chloro-3,3-difluorocyclobutane-2-carbonyl, 2,2,3,3-tetrafluorocyclobutane-1-carbonyl or -1-sulfonyl, β-(2,2,3,3-tetrafluorocyclobut-1-yl)acryloyl, α- or β-methylsulfonylacryloyl, propiolyl, chloroacetyl, bromoacetyl, 4-(β-chloroethylsulfonyl)butyryl, 4-vinylsulfonylbutyryl, 5-(β-chloroethylsulfonyl)valeryl, 5-vinylsulfonylvaleryl, 6-(β-chloroethylsulfonyl)caproyl, 6-vinylsulfonylcaproyl, 4-fluoro-3-nitrobenzoyl, 4-fluoro-3-nitrophenylsulfonyl, 4-fluoro-3-methylsulfonylbenzoyl, 4-fluoro-3-cyanobenzoyl, 2-fluoro-5-methylsulfonylbenzoyl, 2,4-dichlorotriazin-6-yl, 2,4-dichloropyrimidin-6-yl, 2,4,5-trichloropyrimidin-6-yl, 2,4-dichloro-5-nitro- or -5-methyl- or -5-carboxymethyl- or -5-carboxy- or -5-cyano or -5-vinyl- or -5-sulfo- or -5-mono-, -di- or -trichloromethyl- or -5-methylsulfonylpyrimidin-6-yl, 2,5-dichloro-4-methylsulfonylpyrimidin-6-yl, 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2,5-difluoro-6-methyl-4-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 2,6-difluoro-5-bromo-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl- or -5-methylsulfonyl-4-pyrimidinyl, 2-fluoro-5-carboxamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carboxamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 2,6-difluoro-5-methylsulfonyl-4-pyrimidinyl, 2-fluoro-5-sulfonamido-4-pyrimidinyl, 2-fluoro-5-chloro-6-carbomethoxy-4-pyrimidinyl, 2,6-difluoro-5-trifluoromethyl-4-pyrimidinyl, 2,4-bis(methylsulfonyl)pyrimidin-4-yl, 2,5-bis(methylsulfonyl)-5-chloropyrimidin-4-yl, 2-methylsulfonylpyrimidin-4-yl, 2-phenylsulfonylpyrimidin-4-yl, 2-methylsulfonyl-5-chloro-6-methylpyrimidin-4-yl, 2-methylsulfonyl-5-bromo-6-methylpyrimidin-4-yl, 2-methylsulfonyl-5-chloro-6-ethylpyrimidin-4-yl, 2-methylsulfonyl-5-chloromethylpyrimidin-4-yl, 2-methylsulfonyl-5-nitro-6-methylpyrimidin-4-yl, 2,5,6-trismethylsulfonylpyrimidin-4-yl, 2-methylsulfonyl-5,6-dimethylpyrimidin- 4-yl, 2-ethylsulfonyl-5-chloro-6-methylpyrimidin-4-yl, 2-methylsulfonyl-6-chloropyrimidin-4-yl, 2,6-bis(methylsulfonyl)-5-chloropyrimidin-4-yl, 2-methylsulfonyl-6-carboxypyrimidin-4-yl, 2-methylsulfonyl-5-sulfopyrimidin-4-yl, 2-methylsulfonyl-6-carbomethoxypyrimidin-4-yl, 2-methylsulfonyl-5-carboxypyrimidin-4-yl, 2-methylsulfonyl-5-cyano-6-methoxypyrimidin-4-yl, 2-methylsulfonyl-5-chloropyrimidin-4-yl, 2-sulfoethylsulfonyl-6-methylpyrimidin-4-yl, 2-methylsulfonyl-5-bromopyrimidin-4-yl, 2-phenylsulfonyl-5-chloropyrimidin-4-yl, 2-carboxymethylsulfonyl-5-chloro-6-methylpyrimidin-4-yl, 2,4-dichloropyrimidine-6-carbonyl or -6-sulfonyl, 2,4-dichloropyrimidine-5-carbonyl or -5-sulfonyl, 2-chloro-4-methylpyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl, 2,4-dichloropyrimidine-5-sulfonyl, 2,4-dichloro-6-methylpyrimidine-5-carbonyl or -5-sulfonyl, 2-methylsulfonyl-6-chloropyrimidine-4 and -5-carbonyl, 2,6-bis(methylsulfonyl)pyrimidine-4 or -5-carbonyl, 2-ethylsulfonyl-6-chloropyrimidine-5-carbonyl, 2,4-bis(methylsulfonyl)pyrimidine-5-sulfonyl, 2-methylsulfonyl-4-chloro-6-methylpyrimidine-5-sulfonyl or -5-carbonyl, 2-chloroquinoxaline-3-carbonyl, 2- or 3-monochloroquinoxaline-6-carbonyl, 2- or 3-monochloroquinoxaline-6-sulfonyl, 2,3-dichloroquinoxaline-5- or -6-carbonyl, 2,3-dichloroquinoxaline-5- or -6-sulfonyl, 1,4-dichlorophthalazine-6-sulfonyl or -6-carbonyl, 2,4-dichloroquinazoline-7- or -6-sulfonyl or -carbonyl, 2,4,6-trichloroquinazoline-7- or -8-sulfonyl, 2- or 3- or 4-(4',5'-dichloropyridaz-6'-on-1'-yl)phenylsulfonyl or -carbonyl, β-(4',5'-dichloropyridazin-6'-on-1'-yl)propionyl, 3,6-dichloropyridazine-4-carbonyl or -4-sulfonyl, 2-chlorobenzothiazole-5- or -6-carbonyl or -5- or -6-sulfonyl, 2-arylsulfonyl- or 2-alkylsulfonylbenzothiazole-5- or -6-carbonyl or -5- or -6-sulfonyl, such as 2-methylsulfonyl- or 2-ethylsulfonyl-benzothiazole-5- or -6-sulfonyl or -carbonyl, 2-phenylsulfonylbenzothiazole-5- or -6-sulfonyl or -carbonyl and the corresponding 2-sulfonylbenzothiazole-5- or -6-carbonyl- or -sulfonyl derivatives with sulfo groups in the fused-on benzene ring, 2-chlorobenzoxazole-5- or -6-carbonyl or -sulfonyl, 2-chlorobenzimidazole-5- or -6-carbonyl or -sulfonyl, 2-chloro-1-methylbenzimidazole-5- or -6-carbonyl or -sulfonyl, 2-chloro-4-methylthiazole(1,3)-5-carbonyl or -4- or -5-sulfonyl; ammonium-containing triazine rings, such as 2-trimethylammonium-4-phenylamino- and 4-(o, m- or p-sulfophenyl)amino-6-triazinyl, 2-(1,1-dimethylhydrazinium)-4-phenylamino and 4-(o-, m- or p-sulfophenyl)amino-6-triazinyl, 2-(2-isopropylidene-1,1-dimethyl)hydrazinium-4-phenylamino and 4-(o-, m- or p-sulfophenyl)amino-6-triazinyl, 2-N-aminopyrrolidinium-, 2-N-aminopiperidinium-4-phenylamino- or 4-(o-, m- or p-sulfophenyl)amino-6-triazinyl, 4-phenylamino- or 4-(sulfophenylamino)-6-triazinyl which contain 1,4-bis-azabicyclo[2.2.2] octane or 1,2-bisazabicyclo[0.3.3] octane bonded in quaternary fashion in the 2-position via a nitrogen bond, 2-pyridinium-4-phenylamino- or 4-(o-, m- or p-sulfophenyl)amino-6-triazinyl and corresponding 2-onium-6-triazinyl radicals which are substituted in the 4-position by alkylamino, such as methylamino, ethylamino or β-hydroxyethylamino, or alkoxy, such as methoxy or ethoxy, or aryloxy, such as phenoxy or sulfophenoxy.

If the cellulose material used in the process of the present invention is to be decolorized by means of a reducing sulfur compound, it is only possible to use those cellulose materials which have been dyed with a reactive dye of the vinyl sulfone type, i.e. with those which contain the vinylsulfonyl group itself or a radical from which the vinylsulfonyl group is formed by elimination. In the case of these dyes, the bond to the cellulose is destroyed, so that no yellowing residues remain behind on the fiber.

It is advantageous to subject the cellulose feed material to mechanical comminution before it is suspended in sodium hydroxide solution. Mechanical comminution can be carried out using any desired methods, for example pulling and/or grinding operations, tearing or cutting.

The addition of pulp to the cellulose feed material is advantageous when a very low DP (average degree of polymerization) is to be achieved.

The alkali cellulose is preferably produced with 15 to 20% strength by weight alkali metal hydroxide solution, for example sodium hydroxide solution or potassium hydroxide solution, preferably sodium hydroxide solution, at a temperature from 20° to 40° C. It is advantageous to use from 1000 to 3000% by weight parts of alkali metal hydroxide solution per 100 parts by weight of fibers.

If the cellulose feed material was color-sorted beforehand, the resulting alkali cellulose will have the corresponding hue. Preference is therefore given to using single-colored and color-sorted waste textiles.

If a decolorization of the cellulose material is desired, the alkali cellulose is admixed with an alkali metal bisulfite or alkali metal dithionite, preferably sodium bisulfite or sodium dithionite, in an amount from 5 to 30%, preferably 10 to 20%, by weight, based on the cellulose material used, and heated to a temperature from 30° to 100° C., preferably 40° to 80° C., until the alkali cellulose suspension decolorizes. The suspension is then filtered, if necessary, and the crumbly material is "ripened" for ½ to 24 hours, preferably 1 to 5 hours, by slowly stirring it at a temperature from 30° to 80° C., preferably 40° to 60° C.

The ripening in the alkali bath serves to set the degree of polymerization of the cellulose chains and has to be adapted to the particular cellulose material used and to the degree of polymerization desired in the viscose fiber. It is also possible to carry out the ripening in the presence of cellulose-degrading enzymes (cellulases), which are perfectly familiar to the person skilled in the art and are also commercially available, to speed up the setting of the desired degree of polymerization. It is also possible to degrade the celluloses with dilute $H_2SO_4$, which, however, leads to large amounts of $Na_2SO_4$ in the subsequent neutralization.

The colored or optionally decolorized (using a reducing sulfur compound) alkali cellulose is admixed with 1,5 to 4% by weight of carbon disulfide, based on the cellulose material used, so that the temperature does not exceed 30° C. The resulting xanthate is introduced into dilute alkali metal hydroxide solution and stirred to form a homogeneous mass which, for example by a conventional viscose spinning process, is spun into a coagulation bath containing sulfuric acid, sodium sulfate and zinc sulfate to form viscose fibers which are stretched in acid baths, cut, washed, spinfinished and dried. Said coagulation bath generates on spinning the solution a colored or optionally colorless thread which, after stretching, can be woven or knitted up. It is also possible to produce nonwovens.

Instead of spinning the viscose thus obtained into fibers it is also possible to process it into two- or three-dimensional articles.

It is surprising that, despite the chemical bond between the reactive dye and the fiber, the cellulose material can be dissolved and that the dye is neither destroyed nor washed out in the course of the process of the present invention. Surprisingly, the colored viscose material even has the fastness properties originally present, such as lightfastness, perspiration fastness, chlorine fastness, water fastness, rub fastness and wash fastness. Nor was it foreseeable that a reductive destruction of the dye would result in a pure white, unyellowed viscose material being obtained.

In the examples which follow parts are by weight.

EXAMPLES 1) 100 parts of waste cotton textiles which have been dyed with the black dye of the formula

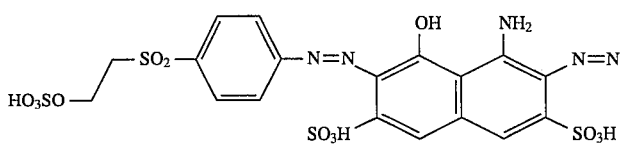

C.I. Reactive Black 5 are comminuted in pullers and cutters to form a powdery material. The powder is admixed with 20 parts of NaOH (33% strength by weight) and 1000 parts of water. Then 8 parts of sodium bisulfite are added and the mixture is boiled up, decolorizing the cellulose material. Thereafter the solution is filtered with suction. 60 parts of these comminuted and decolorized cotton fibers are admixed with 1000 parts of 18% strength by weight sodium hydroxide solution and subsequently stirred for 45 minutes. Afterwards the excess liquor is filtered off through a glass frit. The alkali cellulose thus produced is left to ripen at 60° C. for 60 minutes, cooled down to 15° C. and admixed with 20 parts of carbon disulfide so that the temperature does not exceed 30° C. After 45 minutes' reaction time the yellowish mass is introduced into 450 parts of 4% strength by weight sodium hydroxide solution and the xanthate is stirred to form a homogeneous, viscous dope. After devolatilization the dope is spun by factory-customary viscose spinning processes into a bath containing sulfuric acid, sodium sulfate and zinc sulfate to form colorless fibers, which are stretched in acid baths, cut, washed, spinfinished and dried.

2) 60 parts of cotton fibers which have been dyed with the black reactive dye of Example 1 and comminuted are admixed with 1000 parts of 18% strength by weight sodium hydroxide solution and 4.8 parts of sodium bisulfite, heated to 80° C. for 15 minutes and subsequently stirred at 25° C. for 30 minutes. Afterwards the excess liquor is filtered off with suction through a glass frit. The alkali cellulose thus produced is left to ripen at 60° C. for 60 minutes, cooled down to 15° C. and admixed with 20 parts of carbon disulfide so that the temperature does not exceed 30° C. After 45 minutes' reaction time the yellowish mass is introduced into 450 parts of 4% strength by weight sodium hydroxide solution and the xanthate is stirred to form a homogeneous, viscous dope. After devolatilization the dope is spun by factory-customary viscose spinning processes into a bath containing sulfuric acid, sodium sulfate and zinc sulfate to form colorless fibers, which are stretched in acid baths, cut, washed, spinfinished and dried.

3) 60 parts of comminuted cotton fibers which have been dyed with the dye of the formula

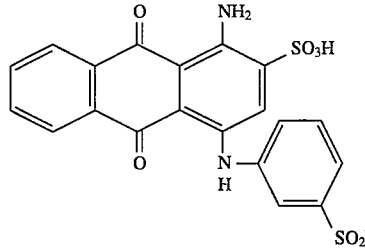

C.I. Reactive Blue 19 are admixed with 1000 parts of 18% strength by weight sodium hydroxide solution and subsequently stirred for 45 minutes. Afterwards the excess liquor is filtered off with suction through a glass frit. The blue alkali cellulose thus produced is left to ripen at 60° C. for 60 minutes, cooled down to 15° C. and admixed with 20 parts of carbon disulfide so that the temperature does not exceed 30° C. After 45 minutes' reaction time the blue mass is introduced into 450 parts of 4% strength by weight sodium hydroxide solution and the xanthate is stirred to form a homogeneous, viscous dope. After devolatilization the dope is spun by factory-customary viscose spinning processes into a bath containing sulfuric acid, sodium sulfate and zinc sulfate to form fibers, which are stretched in acid baths, cut, washed, spinfinished and dried. In this way a blue fiber is obtained without having to dye afresh. The resulting fastness properties correspond to the original fastness properties of the starting material.

4a) 100 parts of waste cotton textiles aminated according to EP-A-0 601 351 and dyed with C.I. Reactive Blue 19 are comminuted in pullers and cutters to form a powdery material. The powder is admixed with 20 parts of NaOH (33% strength by weight) and 1000 parts of water. Then 8 parts of sodium dithionite are added and the mixture is boiled up, decolorizing the cellulose material. Thereafter the solution is filtered off with suction. After devolatilization the dope is spun by factory-customary viscose spinning processes into a bath containing sulfuric acid, sodium sulfate and zinc sulfate to form fibers, which are stretched in acid baths, cut, washed, spinfinished and dried. The fibers or else films or sheets thus produced can also be dyed without salt and alkali. For this, 60 parts of fibers are dyed in a bath of 600 parts of water and 1.2 parts of dye (e.g. C.I. Reactive Yellow 37), and a 2% strength yellow dyeing is obtained.

4b) 60 parts of the dyed, comminuted cotton fibers of 4a) are admixed with 1000 parts of 18% strength by weight sodium hydroxide solution and subsequently stirred for 45 minutes. Afterwards the excess liquor is filtered off with suction through a glass frit. The blue alkali cellulose thus produced is left to ripen at 60° C. for 60 minutes, cooled down to 15° C. and admixed with 20 parts of carbon disulfide so that the temperature does not exceed 30° C. After 45 minutes' reaction time the blue mass is introduced into 450 parts of 4% strength by weight sodium hydroxide solution and the xanthate is stirred to form a homogeneous, viscous dope. After devolatilization the dope is spun by factory-customary viscose spinning processes into a bath containing sulfuric acid, sodium sulfate and zinc sulfate to form fibers, which are stretched in acid baths, cut, washed, spinfinished and dried.

Examples 5 to 20

Waste cotton textiles which have been dyed with the reactive dyes mentioned in the table below are dissolved, xanthated and spun into fibers similarly to Example 2 or 3.

The fastness properties obtained correspond to those of the starting material.

| Ex. | | Hue |
|---|---|---|
| 5 | 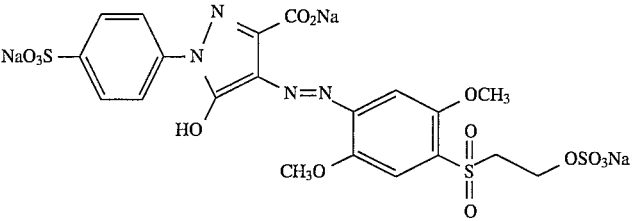<br>(known from European Patent Specification 158 233, Example 1) | yellow |
| 6 | 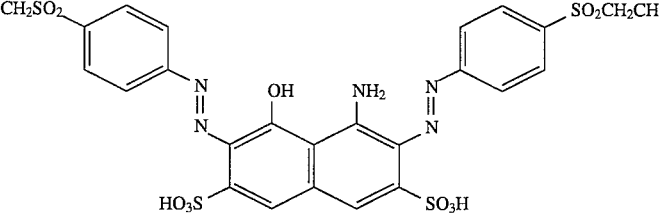<br>C.I. Reactive Black 5 | black |
| 7 | 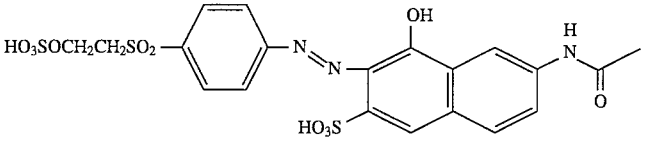<br>(known from EP-A-0 061 151) | orange |
| 8 | 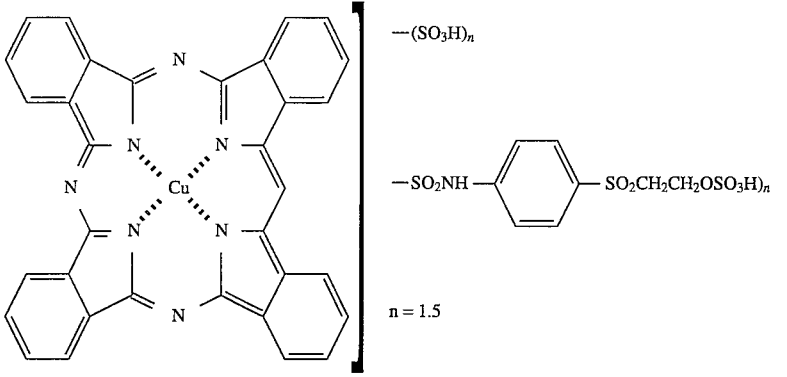<br>(known from Example 2 of German Offenlegungsschrift No. 1 179 317) | turquoise blue |

-continued
| Ex. | | Hue |
|---|---|---|
| 9 | 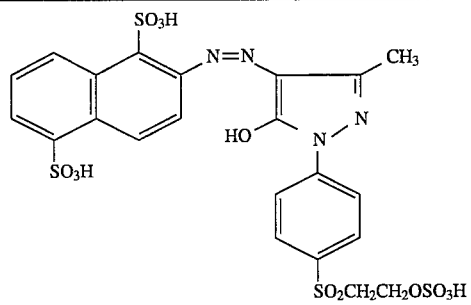 C.I. Reactive Yellow 37 | yellow |
| 10 | 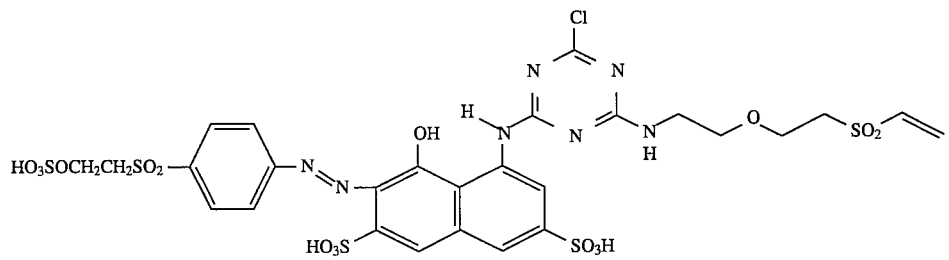 (known from EP-A-0 144 766, Example 5) | red |
| 11 | 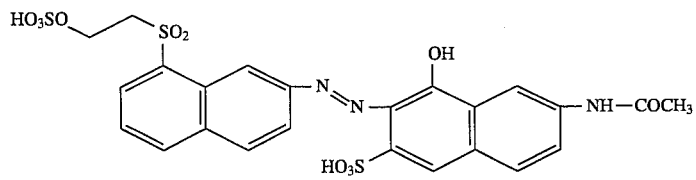 (known from DE-A-1 943 904) | red |
| 12 | 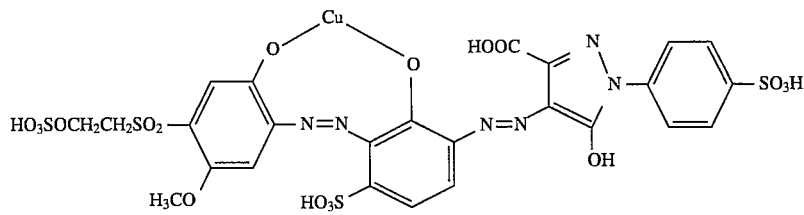 C.I. Reactive Black 31 | black |
| 13 | 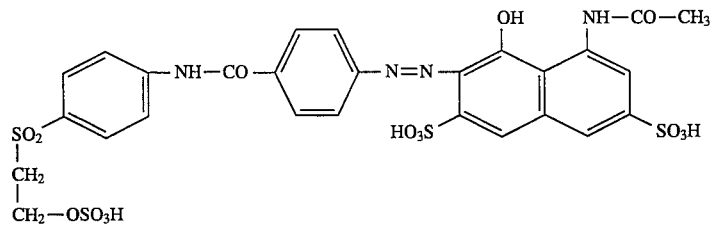 (known from DE-B-1 126 647) | red |
| 14 | 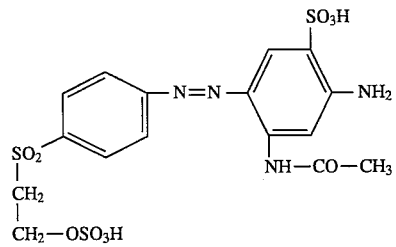 | yellow |

-continued
| Ex. | | Hue |
|---|---|---|
(known from EP-A-0 073 481)
15 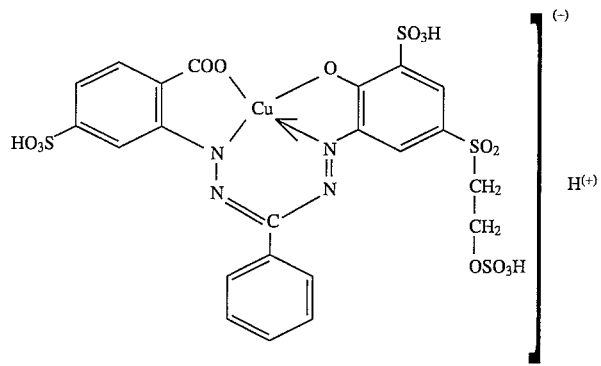 blue
(known from EP-A-0 028 788)
16 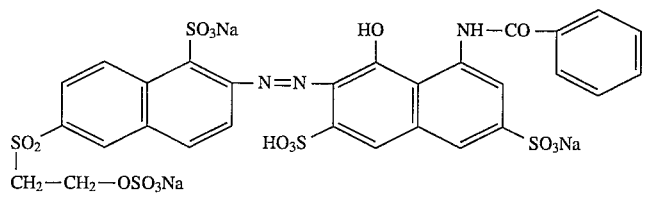 red
(known from EP-A-0 158 233, Example 3)
17 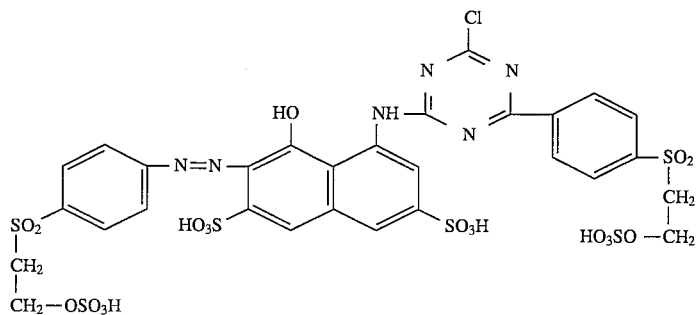 red
(known from EP-B-0 094 055)
18 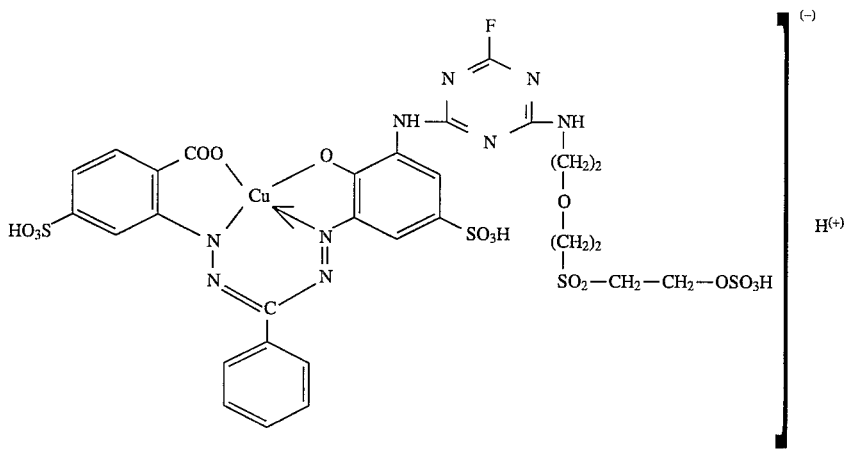 blue
(known from EP-A-0 144 766)

| Ex. | | Hue |
|---|---|---|
| 19 | 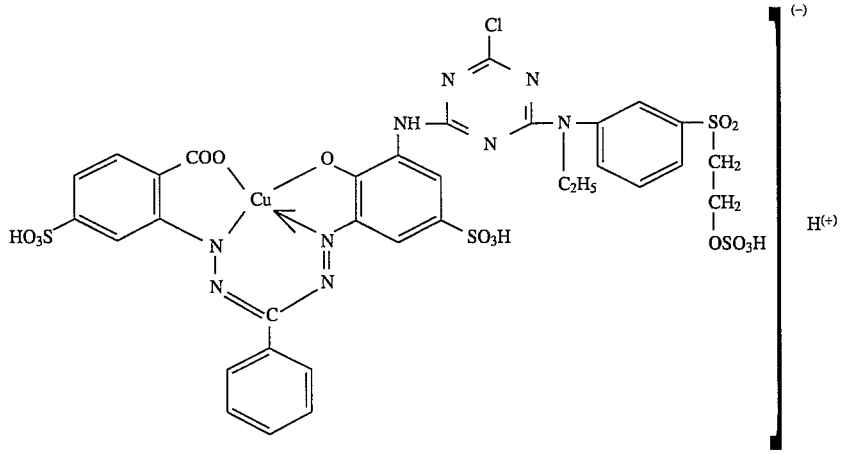<br>(known from EP-A-0 099 721) | blue |
| 20 | 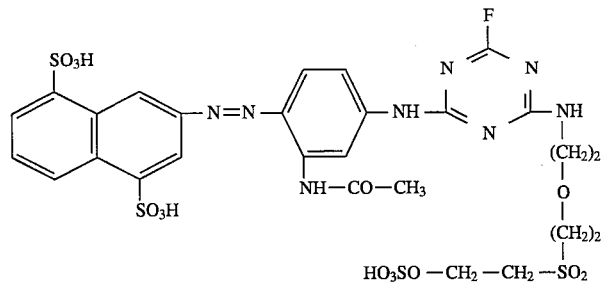<br>(known from EP-A-0 457 715) | |

What is claimed is:

1. A process for recycling dyed cellulosic waste into reusable viscose, which comprises suspending a reactive-dyed cellulose material in an alkali metal hydroxide solution to produce alkali cellulose, then allowing the alkali cellulose to ripen at temperatures from 30° to 80° C. for at least 30 minutes, dissolving the ripened alkali cellulose at a temperature from 10° to 30° C. by conversion with carbon disulfide into a reusable viscose.

2. The process of claim 1, wherein the cellulose material comprises waste textiles composed of cellulose fibers.

3. The process of claim 1, wherein the cellulose material comprises waste textiles composed of cotton.

4. The process of claim 1, wherein the cellulose material comprises waste textiles composed of aminated viscose or cotton fibers.

5. The process of claim 1, wherein the reactive dye is a monoazo, disazo, polyazo, metal complex azo, anthraquinone, phthalocyanine, copper formazan, azomethine, nitroaryl, dioxazine, triphendioxazine, phenazine or stilbene dye.

6. The process of claim 1, wherein mechanically comminuted cellulose material is used.

7. The process of claim 1, wherein single-colored and color-sorted cellulose material is used.

8. The process of claim 1, wherein the cellulose material which has been dyed with a reactive dye of the vinyl sulfone type is suspended in alkali metal hydroxide solution and subjected to the action of a reducing sulfur compound at a temperature from 20° to 80° C.

9. The process of claim 8, wherein the reactive dye has a vinylsulfonyl, β-chloroethylsulfonyl, β-sulfatoethylsulfonyl, β-acetoxyethylsulfonyl, β-phosphatoethylsulfonyl or β-thiosulfatoethylsulfonyl radical.

10. The process of claim 1, wherein the alkali cellulose is subjected to the action of a reducing sulfur compound at a temperature from 20° to 80° C. prior to ripening.

11. The process of claim 10, wherein the reducing sulfur compound is an alkali metal bisulfite or an alkali metal dithionite.

12. The process of claim 10, wherein the reducing sulfur compound is sodium bisulfite or sodium dithionite.

13. The process of claim 10, wherein the reducing sulfur compound is used in an amount from 5 to 30% by weight, based on the cellulose material used.

14. The process of claim 1, wherein the alkali cellulose is allowed to ripen for 1 to 24 hours.

15. The process of claim 1, wherein the alkali cellulose is allowed to ripen in the presence of a cellulose-degrading enzyme.

16. A colored or white viscose fiber, film or sheet produced from the recycled viscose of claim 1.

17. The process of claim 1, wherein pulp is added to the cellulose feed material.

* * * * *